J. B. CLAY.
PIPE COUPLING.
APPLICATION FILED SEPT. 5, 1916.

1,261,213.

Patented Apr. 2, 1918.
2 SHEETS—SHEET 1.

Witnesses:
Robert H. Furin
Arthur W. Carlow

Inventor
Joseph B. Clay
By Higgs & Lee
Attys.

J. B. CLAY.
PIPE COUPLING.
APPLICATION FILED SEPT. 5, 1916.
1,261,213.
Patented Apr. 2, 1918.
2 SHEETS—SHEET 2.
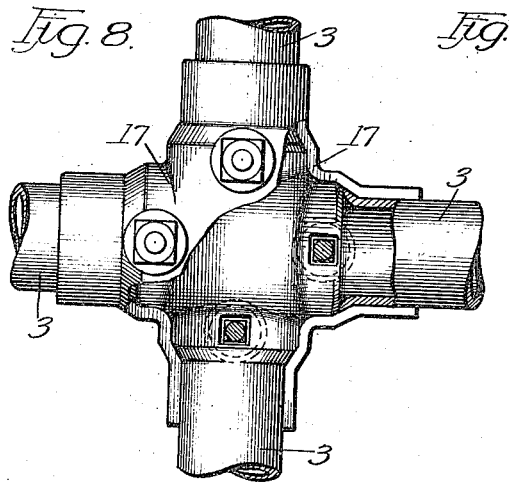
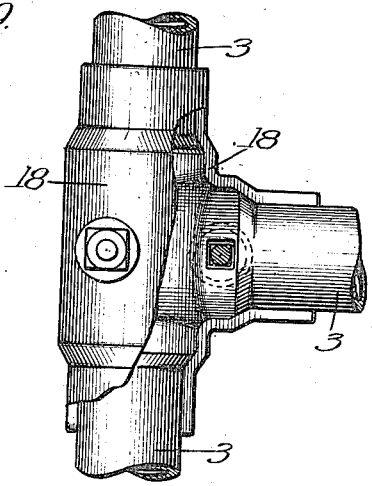
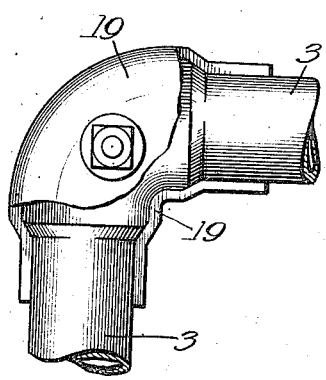
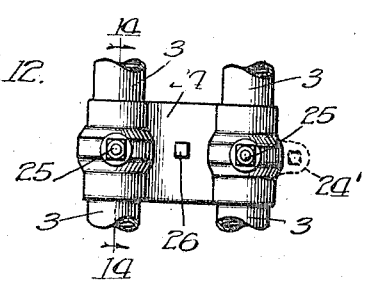
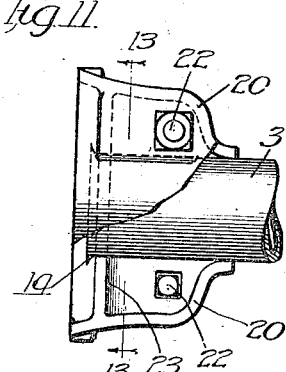
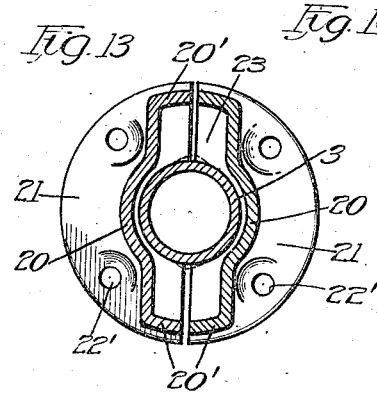
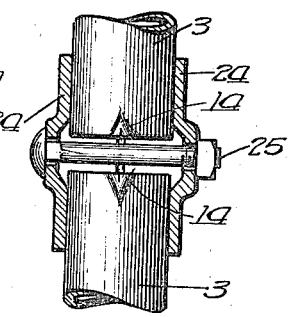
Inventor
Joseph B. Clay

UNITED STATES PATENT OFFICE.

JOSEPH B. CLAY, OF CEDAR FALLS, IOWA.

PIPE-COUPLING.

1,261,213.   Specification of Letters Patent.   Patented Apr. 2, 1918.

Application filed September 5, 1916.   Serial No. 118,500.

*To all whom it may concern:*

Be it known that I, JOSEPH B. CLAY, a citizen of the United States, residing at Cedar Falls, in the county of Blackhawk and State of Iowa, have invented certain new and useful Improvements in Pipe-Couplings, of which the following is a description.

My invention belongs to that general class of devices known as pipe couplings for joining pipe or securing together one end or portion of a pipe, shaft or the like, to another pipe, shaft or other part. Heretofore where a secure and rigid construction was desired, it has been customary to couple the pipe by a threaded engagement, in order that the piping could not be pulled apart except at such times as might be desired. My invention has as an object the construction of a device that is adapted for coupling pipes together as securely as with a threaded engagement, or even more secure, as the pipe is not weakened, and with considerably less work in assembling or disassembling, and with less expense. It has generally among its objects the production of a device of the kind described that is simple, durable, compact, efficient, secure and satisfactory, for use wherever found applicable. It also has as an object the production of a device in which the abutting end of one pipe may be secured to the side or intermediate the ends of another pipe, but which device is to be constructed so that the pipes may be secured together in almost every conceivable way. Many other objects and advantages of the construction herein shown and described will be obvious from the disclosure herein made.

To this end my invention consists in the novel construction, arrangement and combination of parts herein shown and described, and more particularly pointed out in the claims.

In the drawings, wherein like reference characters indicate like or corresponding parts, Figure 1 is a perspective view of one form of my device;

Fig. 8 is a similar view of another form;

Fig. 9 is a similar view of another form;

Fig. 10 is a similar view of another form;

Fig. 11 is a similar view of still another form;

Fig. 12 is a side elevation of another style of coupling;

Fig. 13 is a sectional view substantially on line 13—13 of Fig. 11, and

Fig. 14 is a sectional view taken substantially on line 14—14 of Fig. 12.

Figure 1:
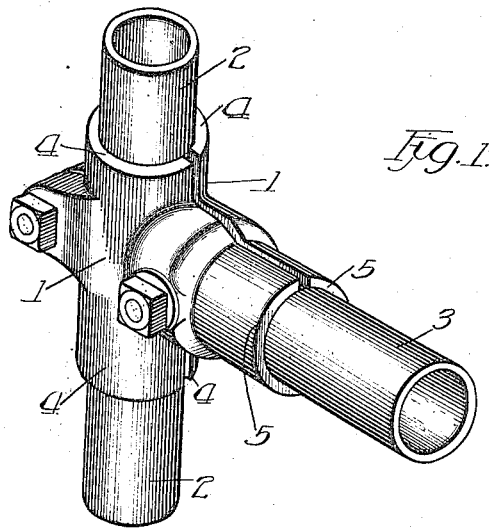
Figure 2:
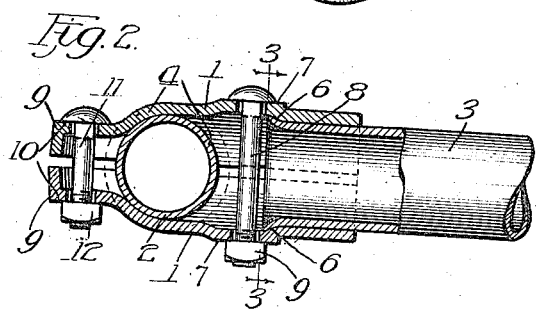
Fig. 2 is a sectional view through the same.
Figure 3:
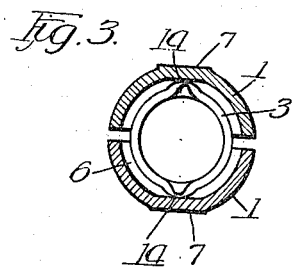
Fig. 3 is a cross sectional view taken substantially on line 3—3 of Fig. 2.

Referring first to the form of device shown in Figs. 1, 2, 3 and 4, 1—1 represent two mating clamping or coupling members, by means of which pipe 3 may be securely clamped and secured to pipe 2, or its equivalent, the coupling being substantially a T fitting, by means of which the abutting end of pipe 3 may be maintained in the desired relation with the body of pipe 2. As shown, the parts 1 are extended as at 4, to give sufficient bearing on the pipe 2, and extended laterally as at 5 to form a bearing on the end of pipe 3. The parts 4 and 5 are so proportioned that they embrace and closely fit the pipes, with a slight space between their meeting edges, so that they may be drawn tight together. As most clearly shown in Figs. 2 and 4, a shoulder 6 is formed on the interior of the members 1, the object of this being most fully explained hereafter. The mating members may be secured together in any suitable manner, preferably by means of bolts. For the purpose I have shown two bolts, it being understood that in some cases one bolt will be sufficient for the purpose. Referring to these figures, I form a boss on each of the two parts, having suitable faces 7 for the head of the bolt 8, and for the nut 9. In the particular construction shown I have provided extensions or lugs 9 on the members at the other side of pipe 2, these being provided with the faces 10 for bearings for the head of the bolt 11 and nut 12.

Figures 4, 5, 6:
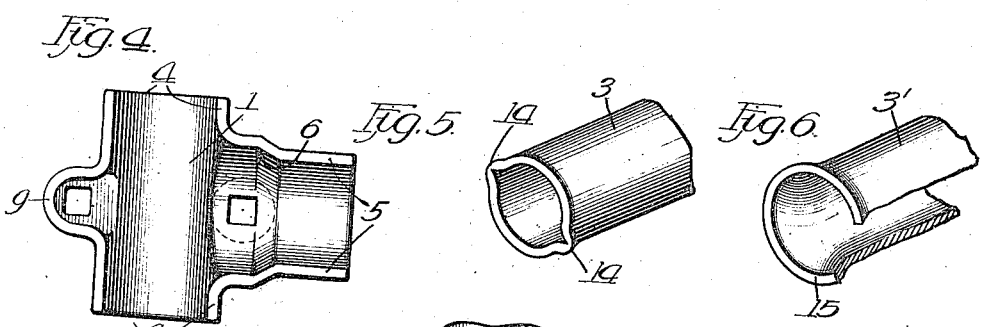
Fig. 4 is a view in elevation of one of the coupling members.
Fig. 5 is a perspective view of a portion of a piece of pipe.
Fig. 6 is a similar view of another piece of pipe.

In this construction a straight continuous pipe 2 is shown, while pipe 3 is the abutting pipe. Before inserting the pipe in the clamp or coupling, I preferably form the same with the offset 14, as most clearly shown in Fig. 5, this being done ordinarily at the job, after the pipe has been cut to the desired length, and formed or bent by means of a cold chisel, hammer, or equivalent means, but it may be done at the factory, this depending upon the work under construction. In Fig. 6 the pipe 3 is illustrated with a lip or bur 15 at the end. Ordinarily the bur resulting from cutting off the pipe is sufficient for the purpose, but I have shown a slightly exaggerated lip, which may be formed in any suitable manner. In using the device the clamp or coupling parts 1—1 are arranged on the pipe 2 with the end of pipe 3 projecting in between the ends of extension 5, a sufficient distance to permit the offsets 14 or the lip 15, depending upon the style of end of pipe used, to engage with the shoulder 6, after which the bolts are drawn tight, securely locking the coupling on pipe 2, but at the same time securely and rigidly engaging the end of pipe 3 and supporting it. It will be noted that this construction permits the coupling of various pipes, even though one is already installed and permanently set, and without removing the installed pipe. As is obvious, considerable pressure may be put on the coupling members, so that the two pipes are securely locked together. Because of shoulder 6 and the offset on the pipe 3, pipe 3 cannot possibly be pulled out endwise and be disengaged from the same without loosening the bolts. I have found this method of coupling the piping together to be most satisfactory and desirable for the purpose of constructing cattle or stock stalls, as the stock, in moving around or rubbing on the stalls, cannot cause the pipe 3 to become detached. The advantage of a construction of this kind is obvious, as the same may be applied on a continuous pipe, similar to 2, and it is not necessary to thread the pipe. This is of importance in all piping work, as it is often necessary to cut pipe on the job, and in the case of threaded couplings, necessary to thread the pipe. New partitions or the like may be attached to fixed piping without disturbing the fixed piping. Ordinarily in a construction of this kind it would be necessary to put a T on two separable abutting pipes 2, and thread all three of the pipes. In my device, however, a continuous pipe 2 may be used, and the coupling may be placed at any place on the pipe. If it is necessary to cut off any of the end of pipe 3 it is an extremely simple matter to offset the end as at 14 on one or both sides, one being sufficient, or the bur on the end of the pipe 6 may be sufficient.

Figure 7:
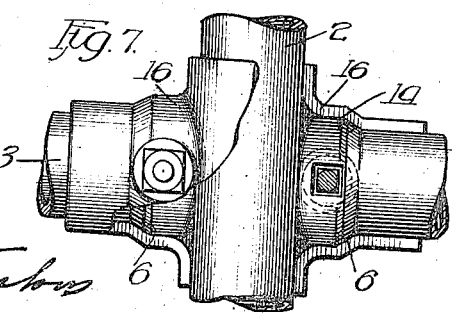
Fig. 7 is a view in elevation, a portion broken away, illustrating another form of coupling.

The form of coupling shown in Fig. 7 is substantially similar except that two pipes 3—3 are secured to the pipe 2, in which case the coupling parts 16 are enlarged on both sides so as to provide the shoulders 14. In this case two bolts may also be employed. Fig. 8 illustrates a construction in which four abutting pipes 3 may be securely fastened together by means of the clamping parts 17, each having shoulders for engagement with the several pipes. Fig. 9 illustrates a construction somewhat similar to Fig. 1, except that the clamping members 18 are arranged to secure three pipes 3 together. The construction shown in Fig. 10 is substantially an elbow construction, the coupling parts 19 being adapted to couple the two abutting pipes 3—3 together. The construction shown in Fig. 11 is somewhat different, the coupling in this case being adapted to secure pipe 3 to a suitable part, as for example a wall, ceiling or floor. The coupling consists of the two parts 21, constituting substantially a flange on the upper pipe embracing parts, they being formed to embrace the pipe and extend substantially as at 20. In this case the pipe end, where it is offset, as at 14, engages with the base part 23 and extends across between the parts 20. In this case the clamping parts may be secured together by the bolts 22, or equivalent means for the purpose, the coupling being secured to the floor, wall, or other part by means of screws or bolts passing through the bolt holes 22' (see Fig. 13).

The coupling shown in Fig. 12 is intended to couple the several pipes 3 together end to end and side by side, as shown, or to couple a continuous pipe with two abutting pipes, or two continuous pipes. Referring to Figs. 12 and 14, 24—24 represents the clamping members arranged to engage the pipes, the same being suitably shouldered on the interior as may be desired. Where the pipes abut, as indicated in the figure, the bolts 25 may pass through between the ends of the pipes. In the case of a continuous pipe, however, a hole 26 may be employed, or the clamping members be extended at one or both sides, as at 24', through which a bolt may be passed.

From the preceding description it will be seen that one or several pipes may be secured in place or to each other, and as securely and as rigidly as if a threaded connection were used. While I have shown the pipes extending substantially at right angles to each other, it is, of course, obvious that this is not necessarily the case, as the angle which the pipes are to abut may be affected by slightly varying the design of the coupling. With a coupling of this kind the pipe may be readily cut on the job and installed with a minimum of labor and expense, and at a minimum of time, as compared with the well known pipe couplings arranged to secure the pipes together by a threaded engagement, or its equivalent. It has the added advantage of greater strength, and the ease in which new work may be added to old.

Having thus described my invention, it is obvious that various immaterial modifications may be made in the same within the scope of pending claims without departing from the spirit of my invention; hence I do not wish to be understood as limiting myself to the exact form, construction, arrangement and combination of parts herein shown and described, or uses mentioned.

What I claim as new and desire to secure by Lettters Patent is:—

1. A pipe coupling of the kind described for securing the abutting end of one pipe to a second pipe, comprising two oppositely formed mating members arranged to embrace said pipes, and means for securing said mating members together, including a bolt passing through said members at points between the pipes, said mating members formed with shoulders on the interior thereof, said abutting pipe being outwardly offset at its end to engage with said shoulders.

2. The combination of a plurality of pipes, one formed with a shoulder at the end, and means for securing said pipes together, comprising a pair of clamping members, said members provided with shoulders on the interior thereof, positioned to engage the shoulder at the end of said pipe, and means for securing said clamping members together, with a space between the edges of the members, consisting of a bolt extended through both members between the pipes, and a nut on the end thereof, said members formed with seats for the bolt head and nut.

3. A device for securing a pipe having a bur at its end to a coöperating part, consisting of a clamping device arranged for attachment to said coöperating part, and formed with a socket of a size at its mouth to embrace and closely fit the end of the pipe, said clamping device having a shoulder on the interior of the same spaced back from the mouth of the socket and of a depth to receive said bur on the end of the pipe, and means for drawing said clamping device together at the mouth of the socket, whereby the pipe is firmly gripped adjacent the end with the bur engaging at the shoulder on the interior of the clamping device, and locked against disengagement with the clamping device upon lengthwise movement of the pipe.

In testimony whereof, I have hereunto signed my name in the presence of two subscribing witnesses.

JOSEPH B. CLAY.

Witnesses:
JOHN H. MEYER,
GEO. F. WOOD.

Copies of this patent may be obtained for five cents each, by addressing the "Commissioner of Patents, Washington, D. C."